United States Patent [19]

Kauffman

[11] 4,053,133

[45] Oct. 11, 1977

[54] PORTABLE WRITING MEANS

[76] Inventor: Robert Carl Kauffman, 342 Windemere Ave., Lansdowne, Pa. 19050

[21] Appl. No.: 688,766

[22] Filed: May 21, 1976

[51] Int. Cl.² ............................................... A47B 3/10
[52] U.S. Cl. ....................................... 248/452; 108/45; 224/42.45 B
[58] Field of Search ............... 248/461, 460, 463, 464, 248/451, 441 R, 452; 108/25, 35, 38, 44, 45; 312/233, 235 R; 224/42.45 B, 29 A, 29 R, 42.46 B

[56] References Cited

U.S. PATENT DOCUMENTS

| 2,825,611 | 3/1958 | Aynesworth | 108/45 |
| 3,031,247 | 4/1962 | Schieve | 248/461 X |
| 3,061,394 | 10/1962 | Whetstone | 312/235 R X |
| 3,104,131 | 9/1963 | Krone | 312/235 A |
| 3,104,895 | 9/1963 | Feuerbach et al. | 108/45 X |
| 3,345,118 | 10/1967 | Cummings | 108/44 X |
| 3,391,659 | 7/1968 | Cross | 108/45 |
| 3,752,376 | 8/1973 | Shelton | 224/42.45 B |

FOREIGN PATENT DOCUMENTS

| 74,504 | 1/1949 | Norway | 248/461 |

*Primary Examiner*—J. Franklin Foss
*Attorney, Agent, or Firm*—David Moore

[57] ABSTRACT

This is a writing companion to be used in a motor vehicle and by which a handy writing companion is had at hand to write memos and orders and consists of a writing panel attached, may be used alone or with a box like member for holding writing material, the panel or box having adjustable means to engage the instrument panel of the car while the remote end rests on the front seat in a handy position for the person in the driver's seat to use the device.

1 Claim, 5 Drawing Figures

PORTABLE WRITING MEANS

The present invention relates to improvements in portable writing means, and relates to a device that provides a removable or it alone, a desk-like member particularly for use in motor cars, where the front seat and instrument panel can be used as its main support.

To accomplish this, and to have it fully understood, attention is invited to the accompanying drawings, in which FIG. 1 is a perspective view of the device in use.

Figure 1:
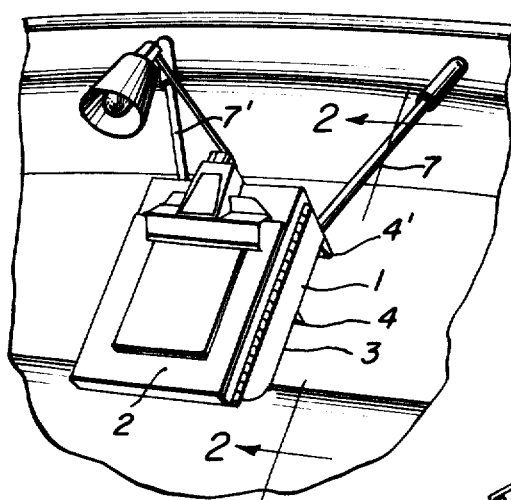
Figure 2:
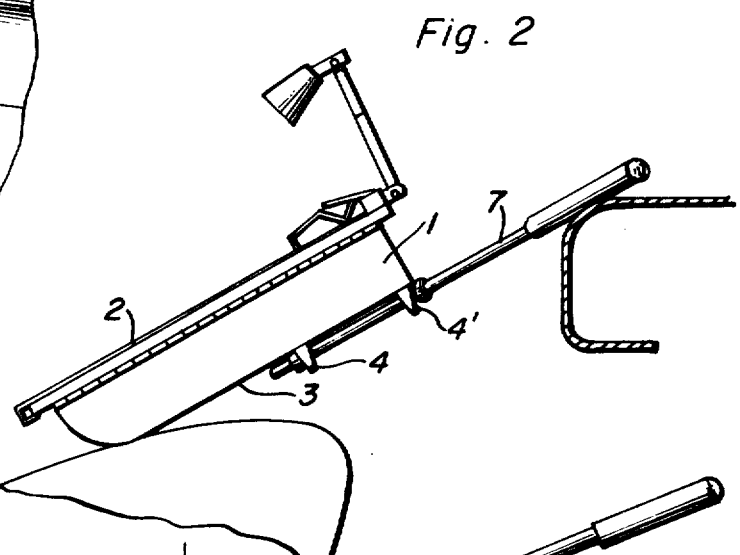
FIG. 2 is a sideview taken on line 2—2 of FIG. 1
Figure 3:
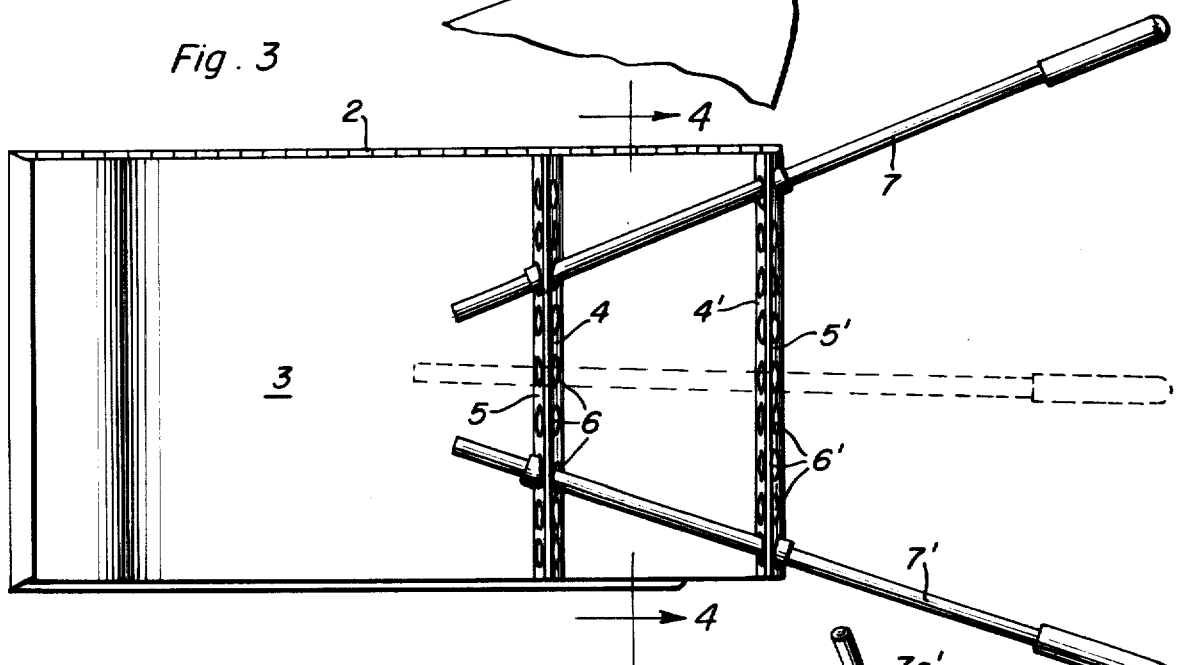
FIG. 3 is a bottom plan view.
Figure 4:
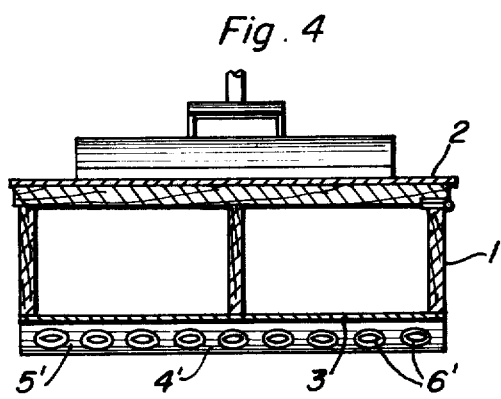
FIG 4 is a sectional view taken on line 4—4 of FIG. 3.
Figure 5:
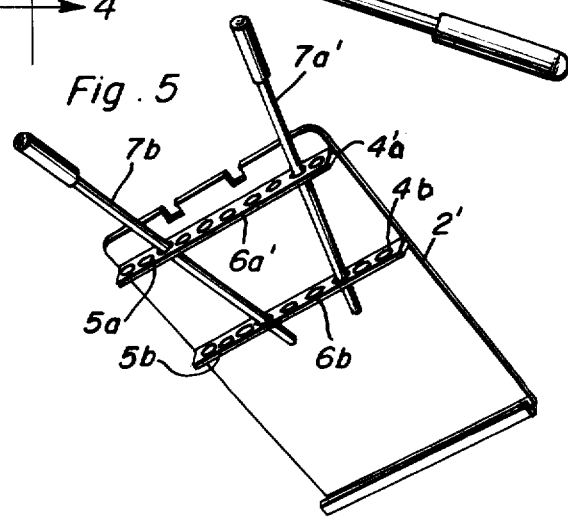

FIG. 5. is a bottom perspective view of a modified form of the present device.

Referring to FIGS. 1 to 4 of the drawings, the numeral 1, designates a box like member having the removable clipboard 2, writing member of this device.

The removable member on top of the lid of the box, while attached to the bottom 3, are two parallel right-angled in cross section members 4 and 4', while in their respective upstanding portions 5 and 5', are ovate openings 6 and 6', these being a' alligned with one another.

In order to provide a support to the upper end of this device, two independently metal rods 7 and 7' are provided. When this device is in use, the rods are inserted in the openings of the members either in streight parallel or one of the other at an angle, that is so that when the writing member is resting upon the front seat, the rubber clad ends of the round metal rods have their respective ends contacting the instrument panel.

It will this be seen and understood that here is provided a writing companion for use in motor cars for one that desires to use a writing desk in a motor car.

Also with this invention, and as shown in FIG. 5, the rectangular box is not used, and on the rear of the rectangular writing surface, here shown as a metal sheet 8, which has attached to the rear thereof the two parallel spaced strips 4a and 4b cross section metal strips 5a and 5b, having elongated openings 6a and 6b to receive the two slidable adjustable rods 7a and 7b, which are similar to those used with the box type previously set forth.

From the foregoing description taken in connection with the drawings, it is evident that here is a useful device for anyone that uses a motor car in his occupation, and needs a desk-like, writing companion that can be quickly and easily used when desired.

What is claimed as new is

1. A portable writing device consisting of a box like member having a removable writing member, two parallel spaced members attached in spaced position and carried upon the back of the main member and having ovate openings in the upstanding portion thereof, and two elongated leg members round in cross section received in the ovate openings and provided with a pair of ring shaped elastomeric elements adapted to functionally engage the leg members and abut the ovate opening thereby forming an adjusting means whereby the device can be used in motor cars by using the front seat and instrument panel as supports.

* * * * *